(12) United States Patent
Buchhauser et al.

(10) Patent No.: US 9,016,459 B2
(45) Date of Patent: Apr. 28, 2015

(54) DEVICE FOR BUFFERING MOLDED PARTS IN A BEVERAGE FILLING PLANT

(71) Applicant: Krones AG, Neutraubling (DE)

(72) Inventors: Klaus Buchhauser, Deuerling (DE);
Sebastian Klepatz, Zeitlarn (DE);
Markus Schönfelder, Deuerling (DE)

(73) Assignee: Krones AG (DE)

( * ) Notice: Subject to any disclaimer, the term of this patent is extended or adjusted under 35 U.S.C. 154(b) by 0 days.

(21) Appl. No.: 14/083,260

(22) Filed: Nov. 18, 2013

(65) Prior Publication Data
US 2014/0138209 A1    May 22, 2014

(30) Foreign Application Priority Data

Nov. 19, 2012  (DE) .......................... 10 2012 111 131

(51) Int. Cl.
| | | |
|---|---|---|
| B65G 1/00 | (2006.01) | |
| B65G 47/26 | (2006.01) | |
| B65G 47/51 | (2006.01) | |
| B67B 3/06 | (2006.01) | |
| B65G 47/14 | (2006.01) | |

(52) U.S. Cl.
CPC .......... *B65G 47/261* (2013.01); *B65G 47/1464* (2013.01); *B65G 47/5136* (2013.01); *B67B 3/06* (2013.01)

(58) Field of Classification Search
USPC ....................................... 198/347.1, 450, 452
See application file for complete search history.

(56) References Cited

U.S. PATENT DOCUMENTS

| | | | |
|---|---|---|---|
| 2,642,173 A | | 6/1953 | Wehmiller et al. |
| 3,357,536 A | * | 12/1967 | Kelly ............................ 198/454 |
| 3,623,596 A | | 11/1971 | Garvey |
| 4,815,580 A | * | 3/1989 | Schanz et al. .............. 198/347.1 |
| 4,925,003 A | | 5/1990 | Limoni |
| 5,372,238 A | | 12/1994 | Bonnet |

FOREIGN PATENT DOCUMENTS

| | | |
|---|---|---|
| DE | 10 26 232 B | 3/1958 |
| DE | 36 44 991 A1 | 8/1988 |
| DE | 3644991 A1 | 11/1988 |
| DE | 41 42 785 A1 | 6/1993 |
| DE | 199 25 989 A1 | 12/2000 |
| DE | 698 00 834 T2 | 11/2001 |
| DE | 10322475 A1 | 12/2004 |
| EP | 1 801 066 A2 | 6/2007 |
| EP | 1 803 681 A2 | 7/2007 |
| FR | 2 899 844 A1 | 10/2007 |
| GB | 980936 | 1/1965 |
| WO | WO2007116155 A1 | 10/2007 |

OTHER PUBLICATIONS

EP13193244.4 Search Report dated Feb. 3, 2014; 7 pages.

* cited by examiner

*Primary Examiner* — James R Bidwell
(74) *Attorney, Agent, or Firm* — Haynes and Boone, LLP (57) ABSTRACT

A device for buffering molded parts in a beverage filling plant, and in one embodiment, for buffering container closures in a beverage filling plant, is described. The device has an intake and an outlet, between which a buffer surface for buffering the molded parts is disposed. The buffer surface is rotatably disposed.

19 Claims, 7 Drawing Sheets

DEVICE FOR BUFFERING MOLDED PARTS IN A BEVERAGE FILLING PLANT

CROSS REFERENCE TO RELATED APPLICATIONS

This application claims priority from German Patent Application No. 10 2012 111 131.6, filed on Nov. 19, 2012 in the German Patent and Trademark Office, the disclosure of which is incorporated herein by reference in its entirety.

BACKGROUND

1. Technical Field

The present invention relates to a device for buffering molded parts in a beverage filling plant, preferably for buffering container closures for a capper in a beverage filling plant.

2. Related Art

It is known to feed container closures, and in particular closure caps for containers, in a beverage filling plant to the actual capper by means of various transport devices. In this, it is known to feed the container closures, for example plastic screw caps for closing PET bottles, via guide chutes to the capper. Differences in elevation between different components of the plant can be overcome by means of, for example, air conveyors, belt conveyors or waterfall conveyors.

Because interruptions can occur in the production process in a beverage filling plant, various storage systems are disposed between the sorter, in which the container closures are sorted into the correct orientation, and the actual capper. These buffer devices can be provided, for example, by elongated systems of channels which have an appropriate holding capacity for the container closures. The appropriate buffering capacity for the container closures that have been presorted into the correct orientation is thus provided by means of configurations which have long transport paths. Accordingly, if a disruption then occurs in the feeding of the container closures to the sorter, or a disruption occurs inside the sorter, the production process in the beverage filling plant can continue to operate, since an adequately large quantity of container closures are still available via the buffer capacity of such a system.

However, the space requirements of such elongated transport paths and/or long systems of channels are a disadvantage. Closure buffers which provide more compact buffering capacities are therefore known. For example, from DE 41 42 785 A1 a device for use with a closure magazine for introducing crown caps or similar devices into a closure channel is known, which has a substantially vertically disposed buffering capacity. The container closures are guided via a narrowing at the output to the subsequent system of channels. The disadvantage of such a buffer system is that the loss of elevation required by the gravity feed makes it necessary to raise the container closures again, or else the container closures must be raised from the outset to a greater elevation. A further disadvantage is that the weight of all of the closures exerts a corresponding downwards pressure, with the result that large forces can arise at the output due to the pressure from above, and this can result in the deformation of the container closures. Accordingly, there is relatively high wear on the container closures caused by the high pressure they exert on each other due to the design of such a buffer device which operates on a gravity principle.

The revolver-like buffering system described in EP 1 801 066 A2 also uses the difference in elevation to empty its revolving shaft. However, first, this results in a complex design of the buffer, with relatively high pressure of the container closures on each other again resulting at the output due to the height of the stack of container closures, and second, the loss of elevation mentioned above again occurs, and this must be compensated for either before or after the revolver-like buffering system.

A loss of elevation also takes place in the buffering solutions known from DE 698 00 834 T2 and EP 1 803 681 A2, which must be compensated for either before or after each of these buffers in order to reach the elevation of the actual processing in the capper.

SUMMARY

Proceeding from the known state of the art, a device for buffering molded parts in a beverage filling plant is provided, which reduces the wear on the molded parts and which facilitates a more efficient arrangement of the plant.

Accordingly, a device for buffering molded parts in a beverage filling plant, for example for buffering container closures in a beverage filling plant, is proposed, wherein the device has an intake and an outlet between which a buffer surface for buffering the molded parts is disposed. The buffer surface is rotatably disposed.

By providing a rotatable buffer surface for accommodating the molded parts, the individual molded parts to be accommodated in the buffer can be stored while traversing a relatively short path on the buffer surface. While the buffer is being built up, each of the molded parts initially finds a substantially clear section of the buffer surface, upon which it can be temporarily stored. During the buffering process, the rotatable buffer surface is, in one embodiment, rotated slowly, so that a molded part that is to be buffered is pushed along a short path to find a section of the surface of the rotatable buffer surface upon which it can be temporarily stored. By the rotation of the buffer surface, the path which a molded part to be stored must traverse on the rotatable buffer surface is minimized, since, for example, when each molded part is pushed onto the rotatable buffer surface it typically traverses a path whose maximum length is the distance to the axis of rotation of the rotatable buffer surface.

At the same time, the temporary storage of the molded parts on the rotatable buffer surface enables the molded parts to be cleared in a simple manner from the buffer surface by means of the rotation of the rotatable buffer surface and the centrifugal forces that arise therefrom. In this, the different circumferential speeds, which depend on the distance from the axis of rotation, assist the clearing of the buffer from the outside to the inside, with the result that no excessive pressure is exerted by the molded parts on each other, and they can be cleared with correspondingly little wear.

The rotatable buffer surface is, in one embodiment, horizontally oriented, so that the pressure that the individual molded parts exert on each other, which is caused by stacking the molded parts on top of each other, cannot arise. This correspondingly keeps to a minimum the wear on the molded parts and the danger of deformation, which in turn minimizes the risk of jams among the molded parts as they are further processed, and facilitates disruption-free operation.

The horizontal orientation of the rotatable buffer surface also makes it possible to avoid a loss of elevation between the intake of the molded parts and the outlet of the molded parts. This enables the energy required for conveying the molded parts to be kept to the necessary minimum, since it is possible to dispense with the overcoming of additional differences in elevation that are caused by the design of buffer devices in the prior art.

The buffer surface is, in one embodiment, formed by a buffer disk, which can be oriented horizontally and which is rotatable about an axis of rotation. By means of the buffer disk, a rotationally symmetrical buffer surface is provided, which enables gentle handling of the molded parts, since the transition of the molded parts from the intake onto the buffer surface, and/or from the buffer surface to the outlet, can take place gently.

In an alternative embodiment, the same advantages can be achieved with a buffer surface which is formed as a rotatable buffer ring. In this case, the buffer ring includes a boundary wall for the molded parts, in order to prevent the molded parts from falling from the buffer ring. By the use of a buffer ring, a maintenance aperture can be formed in the center of the device, through which access to the buffer surface can be gained even if the device is installed in a confined space in a beverage filling plant. In other words, an operator or service technician can reach through or—depending on the dimensions—climb through the maintenance aperture in the buffer ring from below in order to carry out maintenance work, rectify a fault, or perform other tasks, including on the upper side of each of the buffer surfaces.

In one embodiment, the buffer surface and, in certain instances, the buffer disk or the buffer ring is connected with a transport surface for transporting the molded parts from the intake to the outlet, and can be encircled by such a transport surface. The transport of the molded parts via the transport surface, in one embodiment, takes place without buffering, i.e. in the manner of a bypass. In other words, in one further embodiment, the molded parts are intercepted by the transport surface at the intake and then transported on the transport surface directly to the outlet, without the molded parts coming into significant contact with the buffer surface.

In another embodiment, the transport surface is provided as an annular transport ring, and in some embodiments, encircles a circular buffer disk or an annular buffer ring. The transport ring and the buffer disk or buffer ring are thus, in one embodiment, disposed concentrically relative to the axis of rotation of the rotatable buffer surface, and the transport ring is disposed outside the buffer disk or buffer ring. In this manner, during balanced operation in which no buffering of the molded parts is necessary, direct transport without buffering can be achieved between the intake and the outlet. In this case, the molded parts are conveyed along the transport ring or along the transport surface in such a manner that they are not pushed onto the buffer surface which is disposed in the center. The transport surface can also be formed as a section of an annulus or in any other geometry which can be disposed adjoining an area of the buffer surface.

In various embodiments, the transport surface is formed as a transport ring such that it rotates in the direction of transport. Accordingly, in balanced operation a molded part is pushed from the intake onto the transport ring, then transported on the transport ring to the outlet in a gentle manner with little friction, then transferred to the outlet. By this means, transport of the molded parts with very little wear can be achieved in balanced operation.

When a disruption occurs, for example at the outlet, the transport ring is first filled completely between the intake and the outlet by the continued pushing of molded parts onto it. When the transport ring is completely filled, the molded parts that are supplied subsequently via the intake are then displaced onto the buffer surface disposed within the transport ring, and build up a buffer on the buffer surface.

By slow rotation of the rotatable buffer surface, the individual molded parts can be pushed onto it without damaging their material, since the paths along which they must travel on the buffer surface are kept short, so that low-wear handling of the molded parts is achieved. When the disruption at the outlet is then rectified and demand for molded parts resumes, the molded parts on the transport surface, for example the transport ring, are first fed to the outlet. Then the speed of rotation is increased so that the molded parts on the buffer surface are progressively forced outwards, and thereby fed onto the transport ring due to the effects of centrifugal forces. This can continue until the entire reserve accommodated on the buffer disk is cleared.

In a different embodiment, the supply can be operated initially, for example before production begins, with a greater conveying capacity than is required at the outlet, so that a buffer is built up on the buffer surface, as described above. Later, the supply can be correspondingly reduced and, in the event of a disruption in the supply, the buffer accumulated on the buffer disk can be depleted in order to ensure uninterrupted production.

In some embodiments, the transport surface and in particular the transport ring is rotatable, and in particular rotatable independently of the buffer surface. By this means the transporting capacity can be adjusted in balanced operation such that the molded parts are transported from the intake to the outlet without building up or depleting a buffer. In this, the molded parts are, in one embodiment, conveyed such that they do not touch each other, resulting in correspondingly low-wear transport via the transport surface described above. The independent control of the rotation of the buffer surface, which is encircled by the transport surface, accordingly enables the molded parts to be conveyed with low wear, and the buffer surface to be cleared with correspondingly low wear when the buffer capacity needs to be used.

In another embodiment, the supply of molded parts is conveyed directly to the buffer surface. By this means a buffer is initially built up, then by the rotation of the buffer surface the molded parts in the buffer are conveyed by virtue of the centrifugal force to the outside, where they are then transferred to the outlet or the transport surface in order to achieve the discharge of the molded parts. The possibility also exists of operating the buffer surface and the transport surface with the same angular velocity, in which case they can be connected to each other as a single component.

In yet another embodiment, at least two intakes are provided, and/or at least one intake is formed with more than one track, so that it is possible to convey at least two molded parts simultaneously onto the transport surface and/or the buffer surface, or else a plurality of molded parts are introduced into the device simultaneously, wherein for example in each case only one is placed on the transport surface while the others are displaced onto the buffer surface. It is also possible via the at least two intakes to receive molded parts from different upstream stations of the beverage filling plant.

In some embodiments, at least two outlets are provided, and/or at least one outlet with a plurality of tracks is provided, in order, for example, to service a plurality of consuming devices for further processing of the molded parts.

In one embodiment, at least two buffer surfaces disposed one above the other are provided, one of which is connected with an intake and another with an outlet. The buffer surfaces are thereby, in some embodiments, connected with each other via connecting surfaces, for example slides. In this manner, molded parts can pass successively through the buffer surfaces disposed one above the other from the intake to the outlet, with the result that a correspondingly greater total buffer surface is provided.

In a different embodiment, a guide surface is disposed above the buffer surface, at a distance which allows the molded parts to be guided between the buffer surface and the guide surface while remaining correctly oriented. This guide surface can be formed to be stationary or to rotate together with the buffer surface. By means of the guide surface, the molded parts, which have already been correctly aligned and correctly oriented, are prevented from being brought into an incorrect alignment. Accordingly, a distance between the buffer surface and the guide surface is, in one embodiment, formed in accordance with a geometric dimension of the molded parts.

In order to increase the capacity of the proposed device for buffering, at least a second buffer surface, which is disposed above the first buffer surface, can be provided. Accordingly, by raising the buffer surfaces, either one or the other of the buffer surfaces can be selectively exposed to the stream of molded parts, or molded parts can be discharged from each of these buffer surfaces in succession.

In order to enable the accommodation of differently dimensioned molded parts on the buffer surfaces that are disposed one above the other, and simultaneously to keep the space requirements for the device as a whole as low as possible, the vertical distance between the buffer surfaces can be adjusted according to the height of the applicable molded part. For example, when high plastic screw caps are processed, the distance between the two buffer surfaces can be adjusted accordingly, and when flat plastic screw caps are processed, a correspondingly shorter distance can be selected, so that the total height of the buffer tower remains limited. By this means the underside of at least one of the components forming the buffer surface, for example a buffer disk or a buffer ring, can serve as the guide surface for a second buffer surface disposed below it. It is also possible to carry out an adjustment of the distance between a guide surface and a buffer surface.

Accordingly, the method for buffering molded parts in a beverage filling plant, in one embodiment, for buffering container closures in a beverage filling plant, comprises the feeding of the molded parts to a buffer surface. According to various embodiments, the buffer surface rotates during the feeding.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
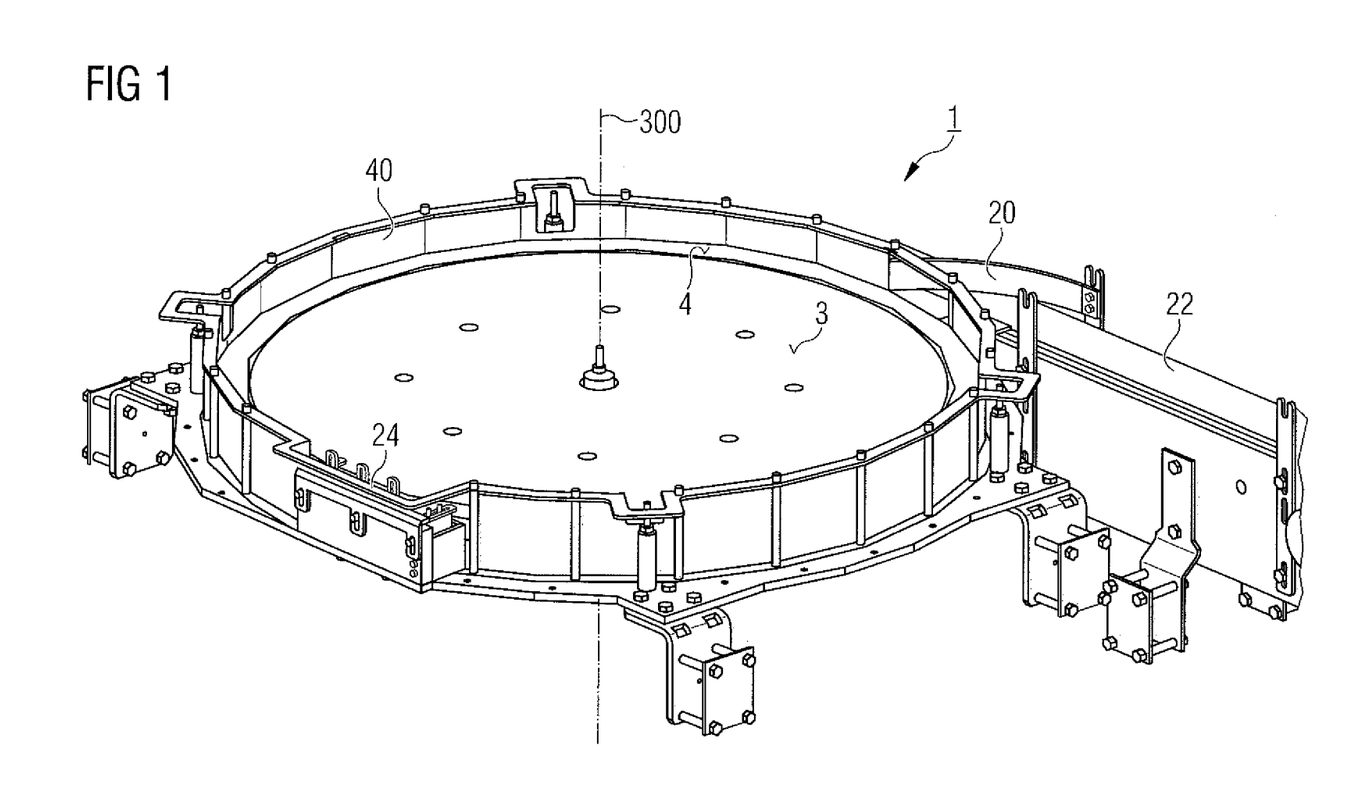
FIG. 1 is a schematic perspective representation of a first embodiment of a device for buffering molded parts in a beverage filling plant.

FIG. 1 shows a device 1 for buffering molded parts (not shown in this figure) in a beverage filling plant. The device 1 is, in one embodiment, used for buffering container closures, for example plastic screw caps that can be screwed onto PET bottles, in a beverage filling plant.

The device 1 for buffering comprises an intake 20 by means of which the molded parts, which are provided via a transport belt 22, are supplied. An outlet 24 is also provided, by means of which the molded parts can in turn be discharged from the device 1, in order to make them available for downstream processing steps. Molded parts, for example in the form of container closures, are usually supplied to the intake 20 via the transport belt 22 from a sorter, which for example ensures an acceptable and uniform quality of the molded parts that are supplied, and ensures that the molded parts are uniformly oriented.

The outlet 24 typically leads to a further transport device, for example to a transport chute or a transport belt, by means of which the molded parts that are discharged from the device 1 are conveyed to a further processing step. For example, container closures can be fed in this manner to a capper, which then applies the container closures to containers which are to be closed. A typical downstream capper comprises capping heads, by means of which plastic screw caps are screwed onto the corresponding neck finish threads of PET bottles.

The device 1 for buffering the molded parts comprises, between the intake 20 and the outlet 24, a rotatable buffer surface 3, which hi the embodiment shown in FIG. 1 is formed as a rotatable buffer disk, which is rotatable about an axis of rotation 300. The rotatable buffer surface 3 is set in rotation using a drive which is not shown, for example, an electric motor with a gear mechanism adapted to this purpose.

The rotatable buffer surface 3 serves to buffer the molded parts that are supplied via the intake 20, wherein by means of the rotation of the rotatable buffer surface 3 an even distribution of the molded parts on the buffer surface 3 can be achieved from the outset, without the molded parts being exposed to an increased pressure which they exert on each other. Furthermore, by means of the rotation of the rotatable buffer surface 3, the individual molded parts need to traverse only relatively short displacement paths during the buildup of the buffer and during the depletion of the buffer. By the reduction of the length of the displacement paths on the buffer surface 3, a reduction in the wear on the molded parts is achieved.

In particular, due to the ability of the buffer surface 3 to rotate, the molded parts that are supplied by means of the intake 20 can initially always find a clear area on the buffer surface 3, onto which they can be pushed. When the buffer surface 3 progressively fills with molded parts during the building up of the buffer, the rotation of the buffer surface still allows the individual molded parts to find the shortest possible route on the buffer surface 3. The maximum length of the path that they must thereby traverse corresponds substantially to approximately the radius of the buffer disk.

When the buffer surface 3 is completely filled with molded parts during the buildup of the buffer, the supply of new molded parts via the intake 20 needs to be stopped, at least when there is no simultaneous removal of molded parts via the outlet 24. The fill level of the buffer surface 3 is monitored using a sensor, which is not shown here.

Figure 2:
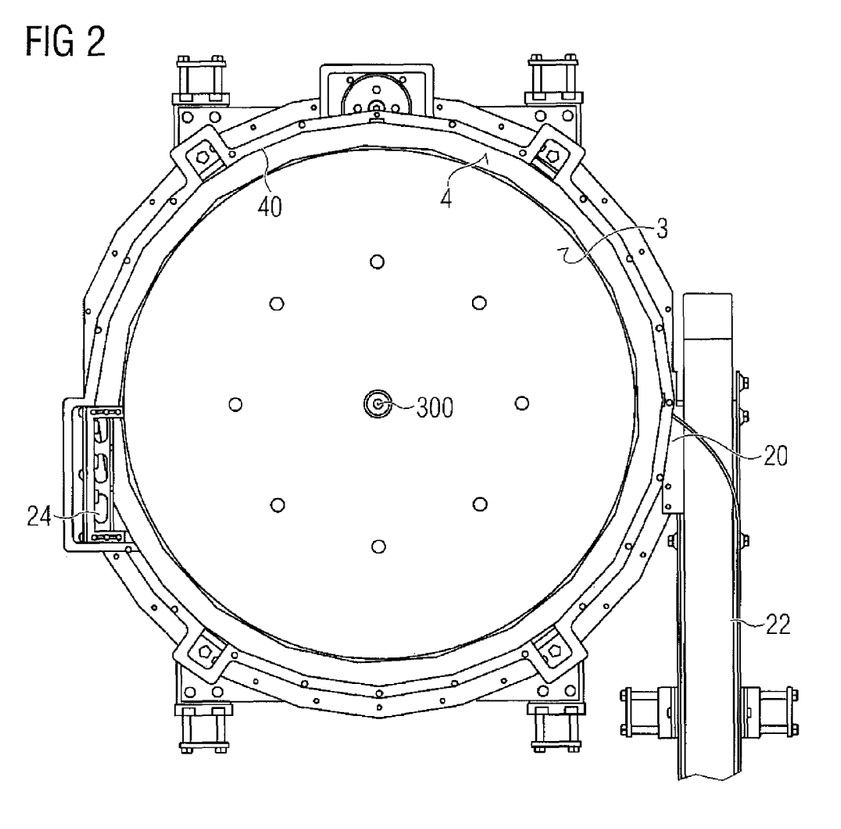
FIG. 2 is a plan view of the device shown in FIG. 1.

In the embodiment shown in FIGS. 1 and 2, a transport surface 4 is further provided, which encircles the buffer surface 3. In the embodiment shown, the transport surface 4 is formed as a transport ring. The inner side of the transport surface 4 directly adjoins the buffer disk 3, and the outer side is bounded by an outer wall 40, which prevents the molded parts from sliding outwards off of the transport surface 4. The outer wall 40 accordingly also serves to guide the molded parts.

In balanced operation, during which the buffer on the buffer surface 3 remains unchanged, i.e. neither built up nor depleted, the molded parts are supplied at the intake 20 via the transport belt 22, and are then conveyed along the transport surface 4 to the outlet 24. In this, the transport surface 4 can either be configured to be stationary, or else it can, like the buffer surface 3, be rotatable.

If the transport surface 4 is stationary, the transport of the molded parts from the intake 20 to the outlet 24 takes place due to the light pressure that the molded parts supplied from the intake 20 exert on each other, in which case the molded parts are pushed along the outer wall 40 to the outlet 24.

In some embodiments, the transport surface 4 is rotated—in one embodiment at machine speed—such that the molded parts supplied via the intake 20 are immediately transported away by the transport surface 4 and then supplied directly to the outlet 24. Because the molded parts are immediately transported away from the intake 20, they exert no pressure on each other, and the molded parts barely slide, or do not slide at all, over the transport surface 4, with the result that very gentle, low-wear handling of the molded parts is achieved.

Similarly, at the outlet 24 the molded parts are immediately removed, so that here too they exert no pressure on each other, and here too the result is gentle, low-wear handling of the molded parts. This mode of operation with a transport surface 4 rotating at machine speed has the additional advantage that the individual molded parts on the transport surface 4 do not abut each other, but are instead immediately carried away from the intake 20 via the transport surface 4. Accordingly, in balanced operation in which the buffer of molded parts on the buffer surface 3 remains untouched, the conveying of the molded parts takes place in a highly gentle and low-wear manner.

The mechanism of building up a buffer of molded parts on the buffer surface 3 has already been described above. In essence, there are two conceivable scenarios. In the first of these, a disruption can occur downstream of the outlet 24, with the result that it is no longer possible to remove the molded parts via the outlet 24, or no longer possible to remove them in the necessary quantities. Consequently, a backlog is formed on the transport surface 4, and this leads to the diversion onto the buffer surface 3 of the molded parts that are subsequently supplied via the intake 20. In this case, therefore, a buffer of molded parts builds up on the buffer surface 3.

During this buildup of the buffer, the buffer surface 3, in one embodiment, rotates slowly. By means of the slow rotation of the buffer surface 3, the buffer surface 3 becomes relatively evenly covered with the molded parts that continue to be supplied via the intake 20, and individual displacement paths of the molded parts on the buffer surface 3 are limited in length, achieving low-wear buildup of the buffer. This process of building up the buffer on the buffer surface 3 is not stopped until it is determined via a sensor (not shown here) that the buffer surface 3 is substantially fully occupied by molded parts.

In the other scenario, molded parts can be supplied via the intake 20 at a higher rate than the rate at which the molded parts are removed via the outlet 24, in order to deliberately build up a buffer of molded parts on the buffer surface 3. Accordingly, a backlog of molded parts again builds up on the transport surface 4 in the manner just described, which eventually again leads to a partial diversion onto the buffer surface 3 of the molded parts that are subsequently supplied via the intake 20. In this manner, a buffer of molded parts builds up on the rotatable buffer surface 3.

The buffer surface 3 and the transport surface 4 can, in one embodiment, be driven by separate drives, such that they can rotate independently of each other and at different speeds. For example, it is envisaged that in balanced operation the transport surface 4 rotates at machine speed but the buffer surface 3 rotates only slowly or not at all, since neither buildup nor depletion of the buffer on the buffer surface 3 takes place.

When a buffer of molded parts is deliberately built up on the buffer surface 3, it is also conceivable to rotate the transport surface 4 only slowly, or even stop it, and simultaneously rotate the buffer surface 3 slowly, so that the molded parts supplied from the intake 20 are thereby pushed into areas of the buffer surface 3 which are as clear as possible. This achieves the depositing of the molded parts on the buffer surface 3 with as little wear as possible.

When depletion of the buffer is desired, the buffer surface 3 is rotated at a higher speed, in order that the centrifugal forces acting on each molded part slowly clear the molded parts from the buffer surface 3, from the outer to the inner molded parts. The centrifugal forces cause the molded parts to be displaced outwards and thereby reach the transport surface 4. The transport surface 4 is then rotated either slowly or at machine speed, in order to convey the molded parts to the outlet 24 and thereby to the next stage of processing.

Because, as mentioned above, the buffer surface 3 and the transport surface 4 can be driven independently, a buffer can be flexibly built up and depleted and/or, in balanced operation, remain untouched, wherein the wear to which the molded parts are subjected is minimized.

As indicated for example in FIG. 1, the intake 20 and the outlet 24 are disposed at the same elevation relative to each other, and the buffer surface 3 is horizontally oriented. The transport surface 4 encircling the buffer surface 3 is also horizontally oriented. This horizontal orientation of the buffer surface 3, the transport surface 4, the intake 20 and the outlet 24 makes it possible for buffering to take place without the prior or subsequent need to overcome an additional difference in elevation, which would in turn entail an additional expenditure of energy. This furthermore enables the elevation at which the device 1 is mounted to be optimized in the context of the other components of the plant, i.e. for example a capper in a beverage filling plant.

Figure 3:
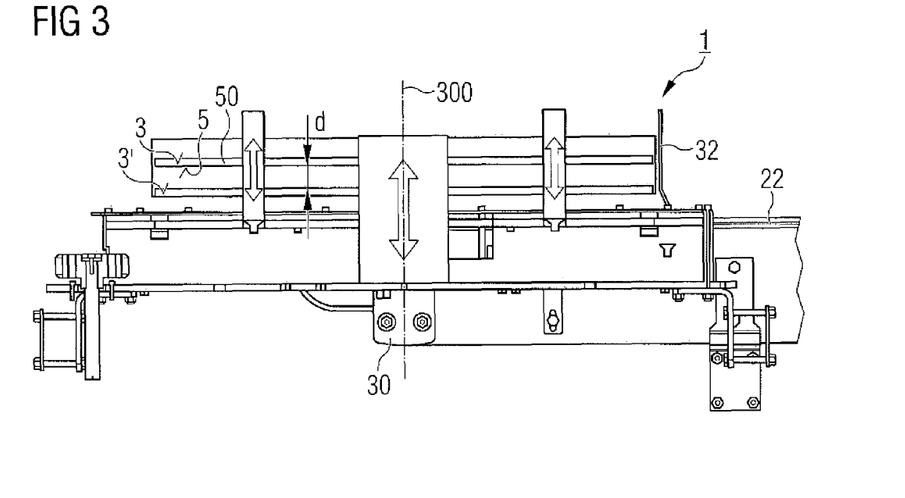
FIG. 3 is a schematic side elevation of a device for buffering molded parts of a second embodiment, which comprises a plurality of buffer surfaces.
Figure 4:
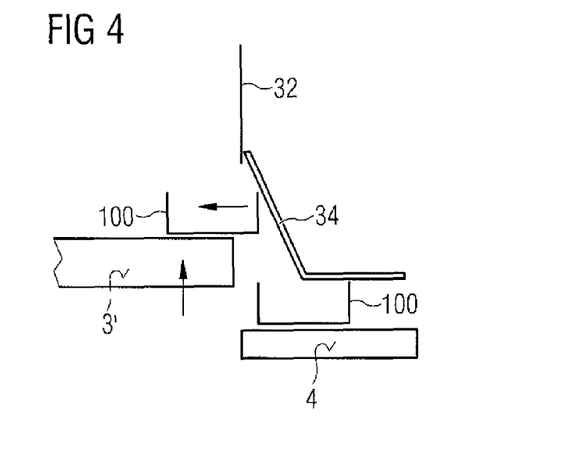
FIG. 4 is a detail view of the embodiment of FIG. 3.

FIGS. 3 and 4 show another embodiment of the device 1, in which two buffer surfaces 3 and 3' are provided, which are disposed vertically one above the other and can be rotated by a common drive 30. In particular, the two buffer surfaces 3, 3' are connected to the drive 30 by a common shaft.

In order to double or multiply the buffer volume of the buffer disk 3, the two buffer surfaces 3, 3' disposed one above the other are accordingly provided, each being suitable for accommodating molded parts. Any desired number of such buffer surfaces 3, 3' can be disposed one above the other in order to provide the necessary capacity.

The buffer surfaces 3, 3' can move successively to the level of the transport surface 4, so that in a first state, in which the buffer is to be filled, the first buffer surface 3 is initially disposed at the same elevation as the transport surface 4, in order to enable molded parts to be supplied to the first buffer surface 3. When it is then determined by means of a sensor that the first buffer surface 3 is completely full, this first buffer surface 3 is raised and the second buffer surface 3' is lifted to the elevation of the transport surface 4. The second buffer surface 3' can then also be loaded with molded parts. Accordingly, the buffer capacity can be doubled in the manner shown in FIGS. 3 and 4. Any desired number of such buffer surfaces 3, 3' can be disposed one above the other in order to multiply the buffer capacity correspondingly using this compact design.

FIG. 4 shows a schematic representation of a side wall 32 with a repelling area 34, which, in the event that any molded parts 100 (shown here by schematically indicated container closures) project over the edge of the buffer surface 3', serves to push these onto the buffer surface 3' in order to enable the raising or lowering of the buffer surfaces 3, 3' to take place without problems. The repelling area 34 is conical in form, so that the molded parts 100 are thereby displaced inwards.

In order further to achieve a particularly effective buffering of molded parts, the vertical distance d between the buffer surfaces 3, 3', which are again formed here as buffer disks, can also be adjusted such that there is room to accommodate the applicable molded parts between the individual buffer surfaces 3, 3'. Thus, for example a flat container closure can be accommodated between buffer surfaces 3, 3' which are spaced at a shorter distance d from each other, while container closures with larger dimensions require a greater distance d. In this manner too, a particularly efficient, flexible and compact buffering process can be provided.

In a further embodiment that is not shown, the intake is not from the side, as shown in FIGS. 1 and 2, with the molded parts pushed directly onto the transport surface 4. Instead, the intake discharges directly onto the buffer surface 3. All molded parts are thereby conveyed via the buffer surface 3. In such an embodiment, it is however necessary for the buffer surface to rotate at a speed sufficient to enable centrifugal force to cause an outward movement of the molded parts in the direction of the transport surface 4, in order to assist the supplying of the molded parts to the outlet 24.

In an additional embodiment, not only one molded part but at least two, and in some embodiments, more than two molded parts are brought in parallel into the device 1 via the intake 20. The supply can thereby be configured to deposit all of these molded parts simultaneously onto the buffer surface 3. In a further embodiment, it is possible to supply the molded parts parallel to each other such that in each case one reaches the transport surface 4 and at the same time the others are conveyed onto the buffer surface 3.

It is of course also conceivable for at least two molded parts to be conveyed parallel to each other on the transport surface 4, and then to be removed, also parallel to each other, at the outlet 24.

Figure 5:
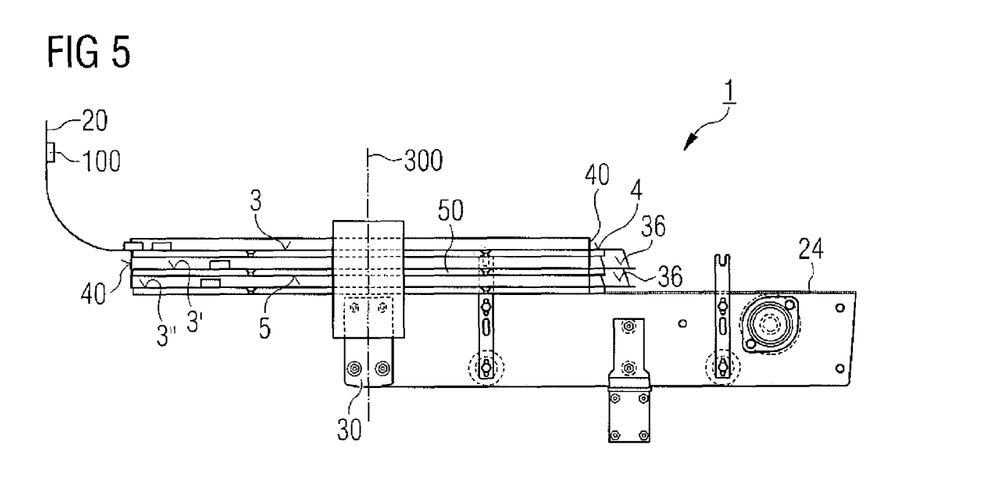
FIG. 5 is a schematic side elevation of a device for buffering molded parts in a third embodiment with three buffer surfaces, which are disposed one above the other and connected with each other via connecting surfaces.

In FIG. 5, a side elevation of a device 1 for buffering molded parts 100 is shown schematically, in which three rotatable buffer surfaces 3, 3', 3" are disposed one above the other. Each of the rotatable buffer surfaces 3, 3', 3" has a transport surface 4 with which it is connected. The buffer surfaces 3, 3', 3" are connected with each other via connecting surfaces 36, so that molded parts 100 can pass from the uppermost buffer surface 3 onto the buffer surface 3' below and then onto the buffer surface 3" below that. The connecting surfaces 36 are disposed in the area of the transport surfaces 4, but can also, in an embodiment which is not shown, connect with the buffer surfaces 3, 3', 3" in other areas, for example in an inner area of the buffer surfaces. The connecting surfaces 36 are here formed as slides, but can be formed as any suitable conveying device.

In the embodiment shown, the intake 20 discharges onto the uppermost buffer surface 3 and the outlet 24 is from the lowest buffer surface 3". In other words, a molded part 100 from the intake 20 first passes through the uppermost buffer surface 3, is then displaced onto the middle buffer surface 3', and is displaced from this onto the lowest buffer surface 3", from which the molded part 100 is then discharged from the device 1 via the outlet 24. In this manner, the buffer capacity can be increased by a factor corresponding to the number of buffer surfaces 3, 3', 3" disposed one above the other.

In the embodiment shown, the undersides of the components 50 which form the buffer surfaces 3, 3', which are here shown in the form of buffer disks, also serve as guide surfaces 5 for the molded parts 100. The distance between each of the buffer surfaces 3', 3" and the guide surface 5 disposed above it is chosen such that the molded parts 100 accommodated between the buffer surface and the guide surface retain their orientation. By this means it is, for example, possible to avoid molded parts 100 in the form of container closures that were supplied with the correct orientation being knocked over by the rotation of the buffer surfaces 3', 3". Accordingly, the molded parts 100 continue to have the correct orientation at the outlet 24, so that they can be further processed without problems. In the embodiment shown, in which the undersides of the components 50 which form the buffer surfaces form the guide surfaces 5, the guide surfaces 5 rotate together with the buffer surfaces, so that the friction between the molded parts 100 and the corresponding buffer and guide surfaces can be kept low.

Figure 6:
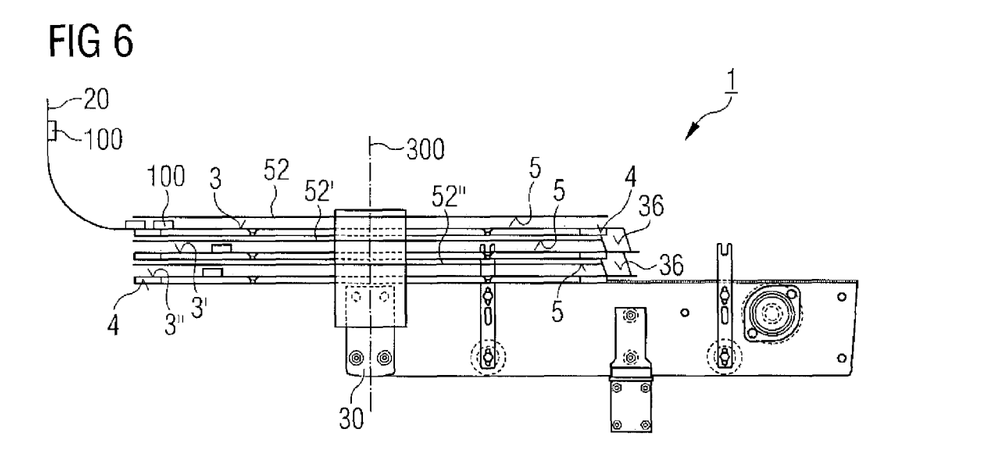
FIG. 6 is a schematic side elevation of a device for buffering molded parts in a fourth embodiment with separate guide surfaces.

FIG. 6 shows a further embodiment with three buffer surfaces 3, 3', 3" disposed one above the other in an arrangement similar to that shown in FIG. 5. Here, in addition to the connections between the buffer surfaces 3, 3', 3" via connecting surfaces 36, guide surfaces 5 are disposed above each buffer surface 3, 3', 3", said guide surfaces being formed by corresponding guide disks 52, 52', 52". In the embodiment shown, the guide disks 52, 52', 52" rotate together with the buffer surfaces 3, 3', 3". In an alternative embodiment which is not shown, however, at least one guide disk 52, 52', 52" can be fixed, and accordingly not rotate with the other components.

The distance between each buffer surface 3, 3', 3" and the guide surface 5 disposed above it formed by the guide disk 52, 52', 52" is chosen to correspond to an appropriate dimension of the molded part. The molded part 100 is thereby conveyed between the buffer surface and the guide surface such that it remains correctly oriented as it passes through the device I.

In a particular embodiment, the distance between each buffer surface 3, 3', 3" and its associated guide surface 52, 52', 52" is adjustable, in order that the device 1 can be adapted to varying geometries of the molded parts 100.

Figure 7:
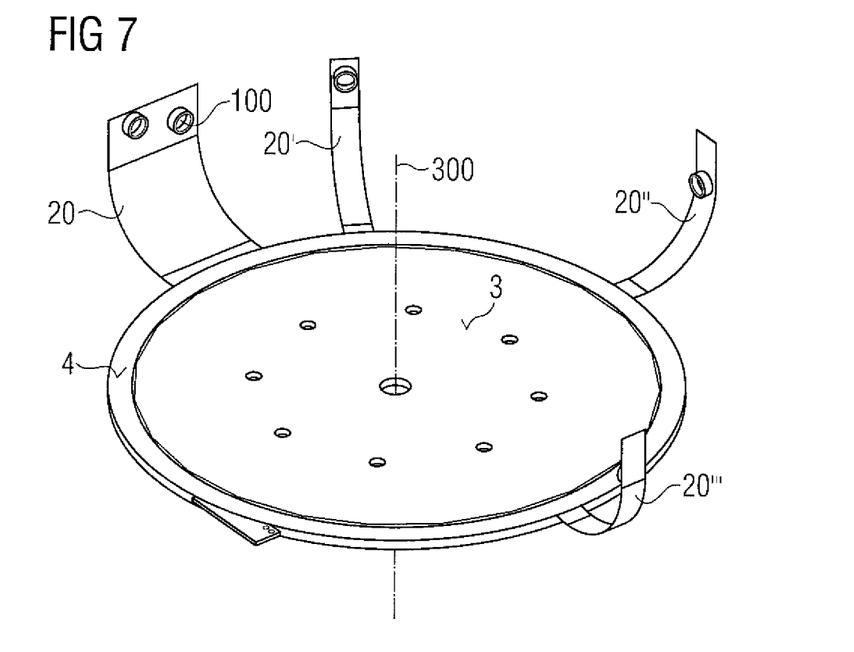
FIG. 7 is a schematic perspective representation of a device for buffering molded parts with a plurality of intakes according to a fifth embodiment.

FIG. 7 shows schematically an aspect of the device, wherein a plurality of intakes 20, 20', 20", 20''' are provided, which feed molded parts 100 onto the buffer surface 3. One of the intakes 20 is also formed with a plurality of tracks, so that it also enables at least two molded parts 100 to be deposited in parallel on the buffer surface 3. In the embodiment shown, the intakes 20, 20', 20", 20''' are connected with the transport surface 4, via which the molded parts 100 can then be deposited on the buffer surface 3.

Figure 8:
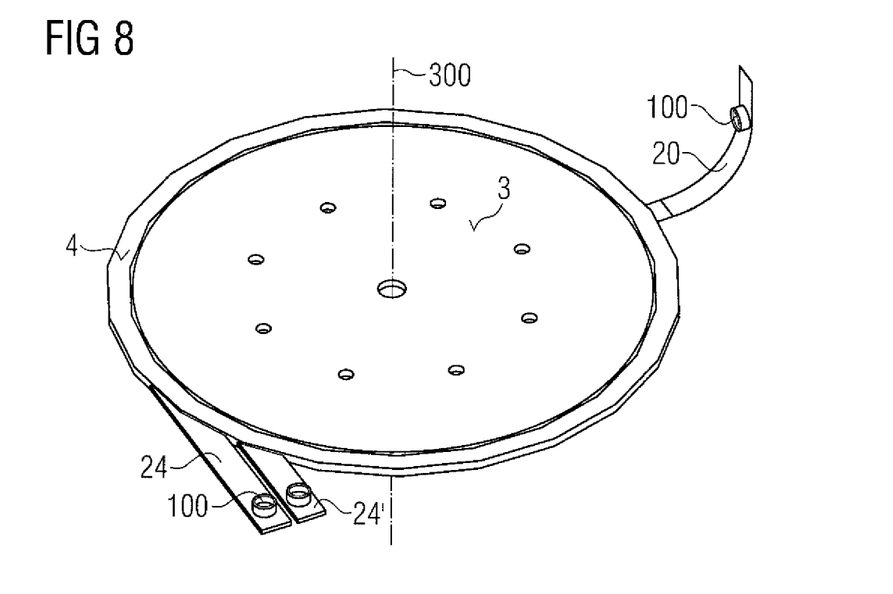
FIG. 8 is a schematic perspective representation of a device for buffering molded parts with two outlets according to a sixth embodiment.

FIG. 8 shows schematically a further aspect of the device, according to which a plurality of outlets 24, 24' can also be provided, which can also be formed with a plurality of tracks. In this manner, different downstream stations can be supplied with molded parts 100.

Figure 9:
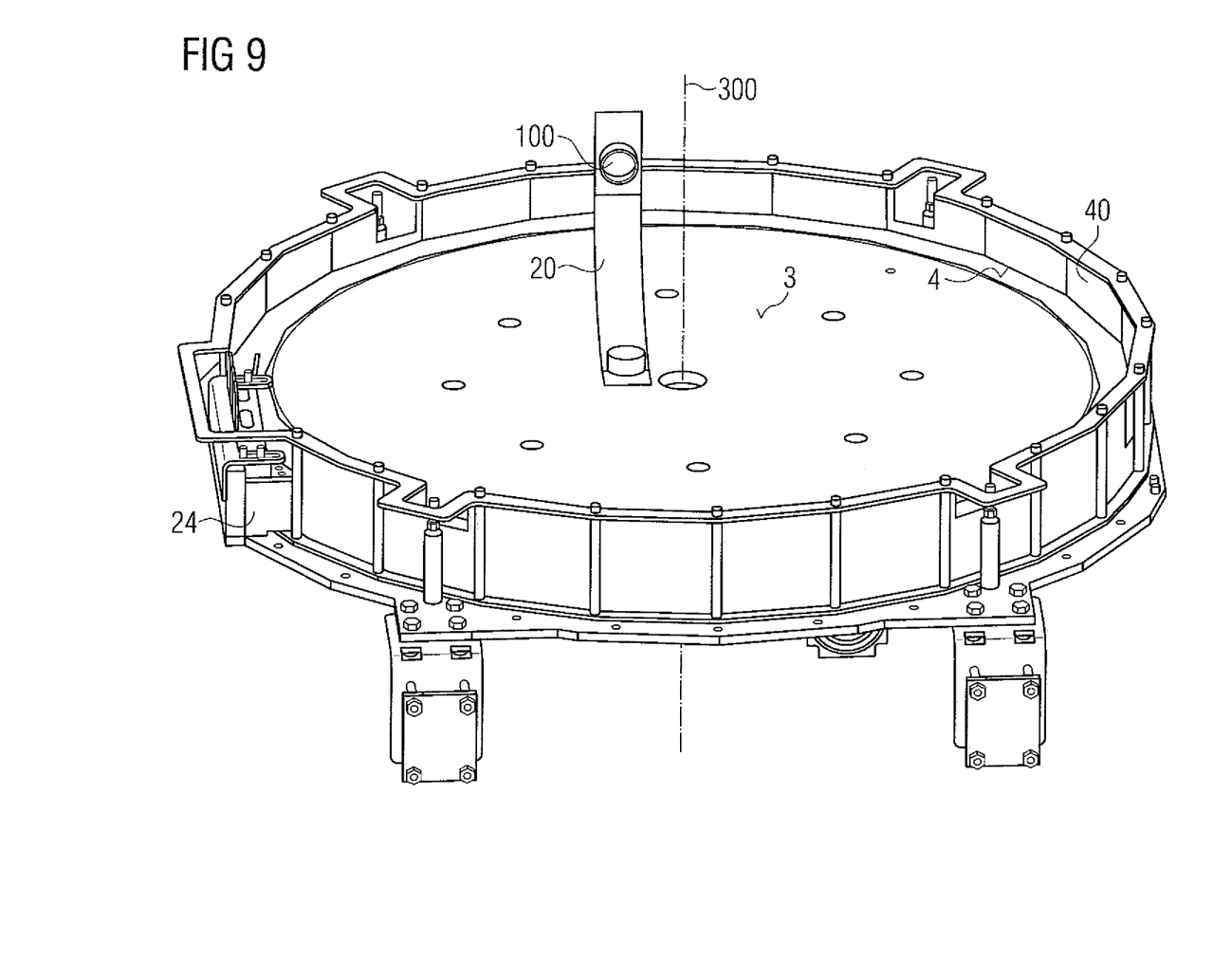
FIG. 9 is a schematic perspective representation of a device for buffering with an intake which discharges onto the buffer surface according to a seventh embodiment.

In FIG. 9, a further embodiment is shown in which the intake 20 discharges directly onto the buffer surface 3. Here the intake 20 is disposed such that the molded parts 100 are deposited substantially in the center of the buffer surface 3 and migrate outwards from there in order to reach the outlet 24 via the transport surface 4.

Figure 10:
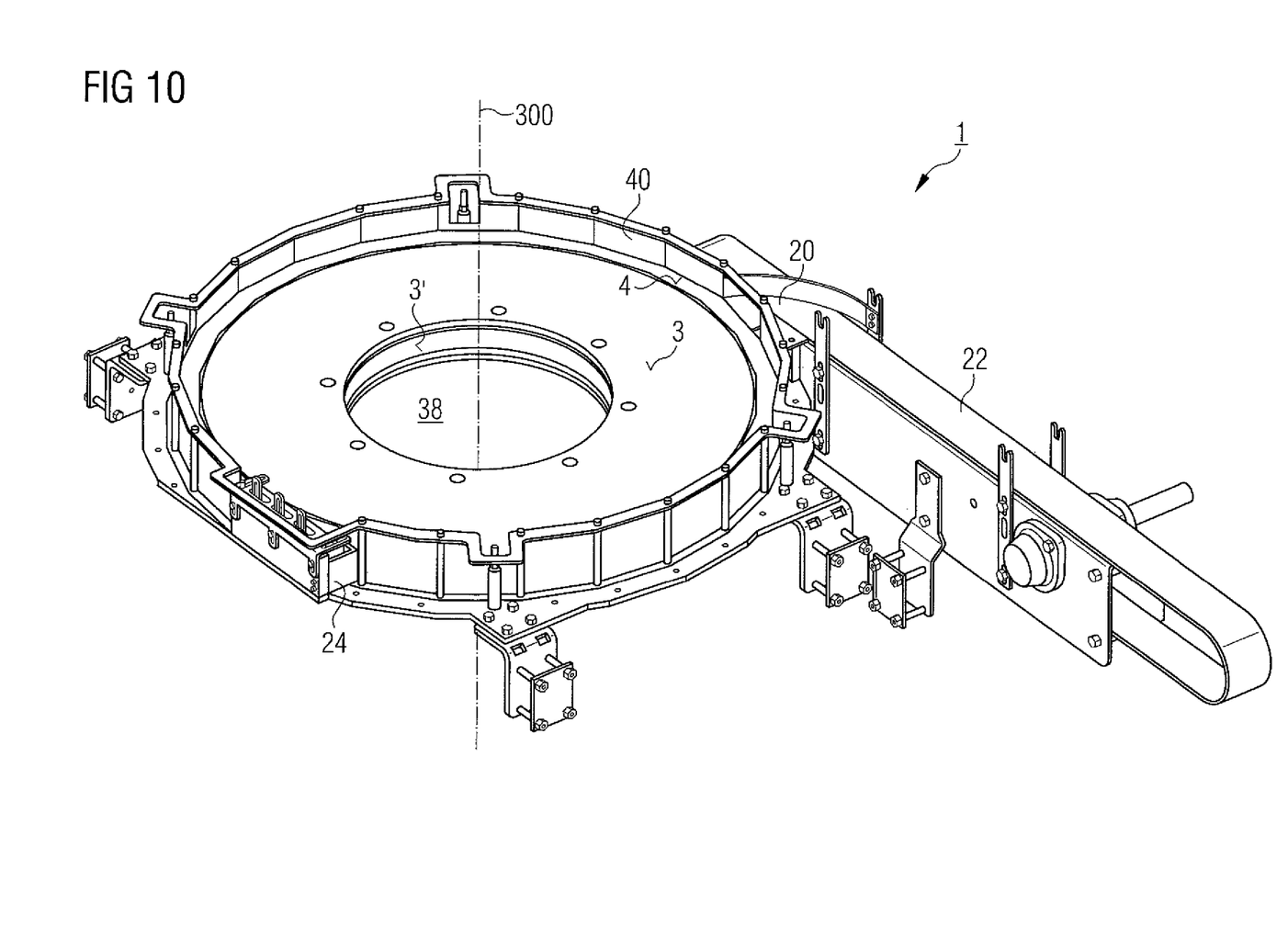
FIG. 10 is a schematic perspective view of a device for buffering in an eighth embodiment which comprises a central maintenance aperture in a buffer surface.

FIG. 10 shows another embodiment of the device 1 for buffering molded parts 100. Here the buffer surfaces 3, 3' that are disposed one above the other are formed as buffer rings, which thereby provide a maintenance aperture 38 in their center. The buffer rings, in one embodiment, have an inner boundary wall, not shown here, for the molded parts 100, in order to prevent the molded parts from falling through the maintenance aperture 38.

Through the maintenance aperture 38, an operator or service technician can also reach the buffer surfaces 3, 3' from below, in order to carry out maintenance work there or rectify faults. The maintenance aperture 38 thereby also provides access to the buffer surfaces 3, 3' if the device 1 is installed in a confined space in a beverage filling plant. In other words, an operator or service technician can reach through or—depending on the dimensions—climb through the maintenance aperture 38 in the buffer ring from below in order to perform maintenance work or other tasks, including on the upper side of the buffer surface.

To the extent applicable, all individual features described in the individual embodiments can be combined with each other and/or exchanged, without departing from the field of the invention.

The invention claimed is:

1. A device for buffering molded parts in a beverage filling plant comprising:
    an intake;
    an outlet; and
    a rotatable buffer surface disposed between the intake and the outlet for buffering the molded parts, wherein the rotatable buffer surface is connected to a transport surface for transport of the molded parts from the intake to the outlet and provides a direct connection between the intake and the outlet.

2. The device of claim 1, wherein the rotatable buffer surface is horizontally oriented.

3. The device of claim 1, wherein the intake and the outlet are disposed at the same elevation relative to each other.

4. The device of claim 1, wherein the rotatable buffer surface comprises a rotatable buffer disk or a rotatable buffer ring.

5. The device of claim 1, wherein the transport surface is annular in form and formed by a transport ring.

6. The device of claim 1, wherein the transport surface is rotatable about an axis of rotation of the rotatable buffer surface.

7. The device of claim 6, wherein the transport surface is rotatable independently of the rotatable buffer surface.

8. The device of claim 1, wherein the intake discharges onto the rotatable buffer surface.

9. The device of claim 1, wherein the intake comprises at least two intakes and/or the intake is formed with a plurality of tracks.

10. The device of claim 1, wherein the outlet comprises at least two outlets and/or the outlet is formed with a plurality of tracks.

11. The device of claim 1, wherein the rotatable buffer surface comprises at least two buffer surfaces that are disposed one above the other, each of which is connected successively with the intake and the outlet.

12. The device of claim 11, wherein the vertical distance between the at least two buffer surfaces is adjustable.

13. The device of claim 1, wherein the rotatable buffer surface comprises at least two buffer surfaces disposed one above the other, wherein one is connected with the intake and one with the outlet, and the at least two buffer surfaces are connected with each other via connecting surfaces.

14. The device of claim 13, wherein the connecting surfaces comprise slides.

15. The device of claim 1, further comprising a guide surface disposed above the rotatable buffer surface at a distance such that the molded parts can be guided between the buffer surface and the guide surface while remaining correctly oriented.

16. The device of claim 15, wherein the distance between the rotatable buffer surface and the guide surface is adjustable to the geometry of the molded part.

17. A method for buffering molded parts in a beverage filling plant comprising:
    feeding the molded parts to a buffer surface; and
    rotating the buffer surface during the feeding, wherein the buffer surface is connected to a transport surface for transport of the molded parts from an intake to an outlet and provides a direct connection between the intake and the outlet.

18. The method of claim 17, wherein the buffer surface is rotated at a speed such that the molded parts are forced outwards due to the centrifugal force.

19. A device for buffering molded parts in a beverage filling plant comprising:
    an intake;
    an outlet; and
    a rotatable buffer surface disposed between the intake and the outlet for buffering the molded parts, wherein the rotatable buffer surface is connected to a transport surface for transport of the molded parts from the intake to the outlet, wherein the transport surface is rotatable about an axis of rotation independently of the rotatable buffer surface.

* * * * *